UNITED STATES PATENT OFFICE.

JOHN BABILLION, OF DETROIT, MICHIGAN.

PROCESS OF CONDENSING MILK.

SPECIFICATION forming part of Letters Patent No. 643,032, dated February 6, 1900.

Application filed October 29, 1895. Renewed August 24, 1899. Serial No. 728,372. (No specimens.)

*To all whom it may concern:*

Be it known that I, JOHN BABILLION, of Detroit, in the county of Wayne and State of Michigan, have invented a new and useful Improvement in the Manufacture of Condensed Milk, of which the following is a specification.

My invention consists in an improvement in the manufacture of condensed milk hereinafter fully described and claimed.

The process of condensing milk commonly in use is as follows: Raw milk is heated or forewarmed to various degrees of temperature, care being taken, however, to fall short of the boiling-point, and then mixed with sugar and the liquid portions evaporated, usually in a vacuum-pan. It is then put in cans and cooled, and finally put in tins and hermetically sealed for market. Milk thus treated sooner or later becomes thick, and frequently small lumps of some tough substance are found therein, and these lumps often assume a reddish color and give the milk a disagreeable odor. This is especially true of condensed milk prepared in the spring and early summer and is also true of condensed milk prepared in the autumn, although not to so great an extent. It is to avoid these defects that my process is designed.

I take fresh milk, heat it, and then pass it through filtering-paper or similar filtering material of such fineness that considerable force is necessary to pass the milk therethrough. For this purpose I employ a centrifugal machine with the filtering-paper surrounding the milk-receptacle. I then add sugar to the milk, condense it, and prepare it for market in the usual way. Instead of filtering the heated milk before adding the sugar the sugar may be first added and dissolved in the milk and the milk then filtered. I usually add the sugar to the milk before filtering, as foreign substances get in with the sugar and are removed by the filtering operation.

I find that the result of the filtering operation is to remove something from the milk, which something I believe to be albumen and caseine which have been coagulated by the heat, and the result is that the milk does not thicken and that the small lumps which will ordinarily be found in condensed milk as now prepared do not appear, and the milk after being put in tins remains indefinitely of the same consistency as when first put up.

I have thus far described the process which is used in making the product known as "condensed milk." There is a similar article known as "evaporated cream," which is practically condensed milk without the addition of sugar and the process of making which is practically the process above described minus the sugar, except that after it is put into tins the tins and contained product are subjected to a higher heat than is used in its manufacture. My invention is as applicable to this process as it is to the process of condensing milk.

What I claim as my invention is—

The process of condensing milk involving the steps of heating raw milk, then forcing the milk through a filtering medium to remove coagulum and then evaporating the liquid elements.

JOHN BABILLION.

Witnesses:
 DENTON GUINNESS,
 AMELIA J. WILLIAMS.